United States Patent
Roth et al.

(10) Patent No.: US 7,529,958 B2
(45) Date of Patent: May 5, 2009

(54) PROGRAMMABLE POWER TRANSITION COUNTER

(76) Inventors: Charles Roth, 6406 Copperlily Cove, Austin, TX (US) 78759; Amit Dor, 44b Bialik St., Raanana 43610 (IL)

( * ) Notice: Subject to any disclaimer, the term of this patent is extended or adjusted under 35 U.S.C. 154(b) by 594 days.

(21) Appl. No.: 10/989,948

(22) Filed: Nov. 15, 2004

(65) Prior Publication Data

US 2006/0107077 A1 May 18, 2006

(51) Int. Cl.
*G06F 1/00* (2006.01)

(52) U.S. Cl. ............... 713/330; 713/300; 713/320; 713/324

(58) Field of Classification Search ............ 713/300, 713/320, 322, 324, 600, 330
See application file for complete search history.

(56) References Cited

U.S. PATENT DOCUMENTS

| | | | | |
|---|---|---|---|---|
| 4,479,191 A * | 10/1984 | Nojima et al. | ............... | 713/321 |
| 5,454,114 A * | 9/1995 | Yach et al. | ............... | 713/330 |
| 5,628,020 A * | 5/1997 | O'Brien | ............... | 713/322 |
| 6,760,846 B1 * | 7/2004 | Yoshida et al. | ............... | 713/300 |
| 6,853,929 B2 * | 2/2005 | Weng et al. | ............... | 702/60 |
| 6,892,315 B1 * | 5/2005 | Williams | ............... | 713/502 |
| 7,009,369 B2 * | 3/2006 | Ni et al. | ............... | 323/267 |
| 7,149,915 B2 * | 12/2006 | Matsuoka et al. | ............... | 713/502 |
| 2003/0135771 A1 * | 7/2003 | Cupps et al. | ............... | 713/320 |
| 2003/0227564 A1 * | 12/2003 | Lim | ............... | 348/375 |
| 2006/0107077 A1 * | 5/2006 | Roth et al. | ............... | 713/300 |

FOREIGN PATENT DOCUMENTS

JP 2002312073 A * 10/2002

OTHER PUBLICATIONS

EE Times article Jun. 24, 2004, "Soc IP Blocks Solve the 3G Power Management Issues".
John A. Ford, Virual Silicon, Sep. 13, 2004, "Power Management IP: Coming to the Rescue for Nanometer Design".
Electronic News, Jul. 17, 2004, "Power Management IP Plateform to Cut Leakage".

* cited by examiner

*Primary Examiner*—Mark Connolly
(74) *Attorney, Agent, or Firm*—Blakely, Sokoloff, Taylor & Zafman LLP

(57) ABSTRACT

Method, apparatus and system embodiments are disclosed for one or more programmable registers to hold wakeup time values for power management. For at least one embodiment, information based on the values in the programmable registers may be utilized by a power management unit to determine whether a power island has had sufficient time to transition out of a low power state. The values of the programmable registers may be dynamically modified during operation of a processing system. Other embodiments are also described and claimed.

40 Claims, 8 Drawing Sheets

PROGRAMMABLE POWER TRANSITION COUNTER

BACKGROUND

1. Technical Field

The present disclosure relates generally to information processing systems and, more specifically, to power management within a computing system.

2. Background Art

Power management in a computing system involves efficiently directing power to different components of the system. By selectively reducing power to portions of the system that are not currently being used, power needs of the system may be reduced. Power management may be particularly useful for portable devices that rely on battery power, but may also be useful in desktop and server devices. Length of battery life for a portable computing device is often a key metric for user satisfaction with the device. Reducing power to unused portions of the computing system may save battery power by reducing power leakage from the unused portions and thus reducing overall power consumption of the system. For desktop and sever devices, reducing power to unused portions of the computing system to provide reduced power consumption may be useful for a myriad of reasons, including (but not limited to) energy conservation and reduced costs for operational power.

In a computer system with this type of selective power control, individual portions of the system that are not in current use may be thus placed in a reduced power state to save electrical power and, for mobile devices, to extend battery life. Such implementations may wait until a need for a particular portion of the system arises before powering up that portion. Transitioning from a reduced power state to a fully operational state takes a finite period of time. The system may need to wait for the needed portion to be powered up and ready before utilizing that portion, because circuits may not behave predictably if the voltage level is too low.

BRIEF DESCRIPTION OF THE DRAWINGS

Embodiments of the present invention may be understood with reference to the following drawings in which like elements are indicated by like numbers. These drawings are not intended to be limiting but are instead provided to illustrate selected embodiments of an apparatus, system, design, and method for a programmable counter register. In the drawings.

DETAILED DESCRIPTION

Method, apparatus, design and system embodiments disclosed herein disclose a programmable counter register for power management, along with associated methods of design and use for such a register. In the following description, numerous specific details such as types of computing devices, protocols, power island configurations, and system architectures have been set forth to provide a more thorough understanding of the present invention. It will be appreciated, however, by one skilled in the art that the invention may be practiced without such specific details. Additionally, some well known structures, circuits, and the like have not been shown in detail to avoid unnecessarily obscuring the present invention.

In the following discussion, references to "one embodiment", "an embodiment", "example embodiment", "various embodiments", etc., indicate that the embodiment(s) of the invention so described may include a particular feature, structure, or characteristic, but not every embodiment necessarily includes the particular feature, structure, or characteristic. Further, repeated use of the phrase "in one embodiment" does not necessarily refer to the same embodiment, although it may.

Various embodiments of the invention discussed herein provide for a portion of a processing system, where the portion is in a low power state, to be powered up to full operating power. A comparator may compare whether a current time meets or exceeds a value in a programmable register. (The current time may be reset when full power is applied to the portion.) If the comparator indicates that the portion has had sufficient time to fully power up, a power management unit may indicate to the rest of the processing system that a low power state has been exited and/or that a fully powered state has been entered. The wakeup wait time value in the programmable register may be dynamically modified during operation of the processing system.

Figure 1:
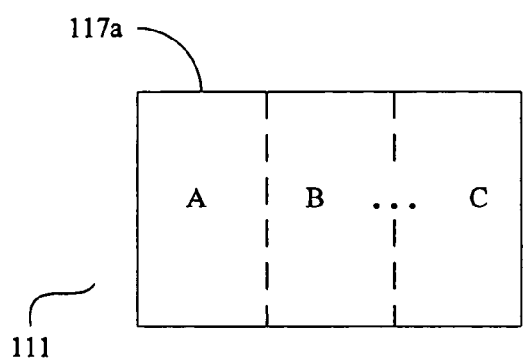
FIG. 1 is a block diagram illustrating example embodiments of computing systems that each includes one or more power islands.
Figure 1:
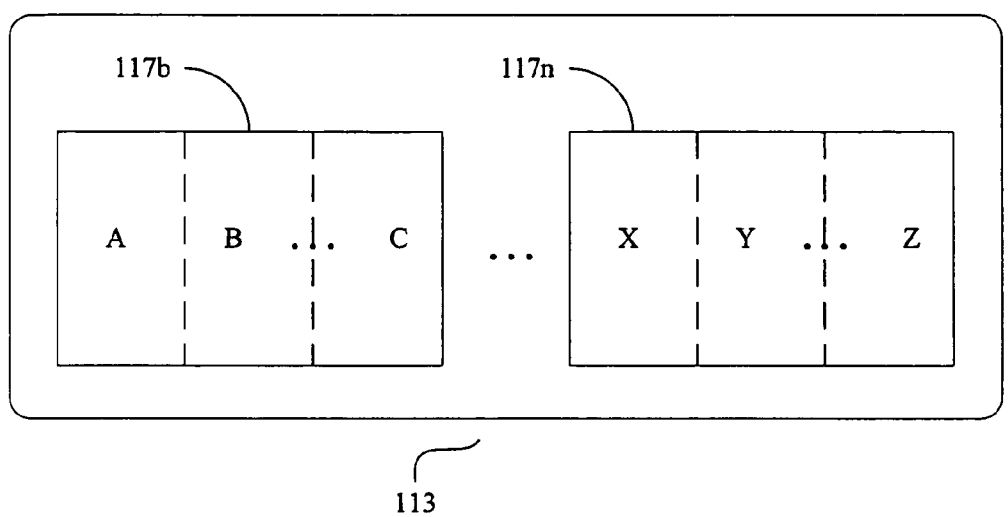
Figure 1:
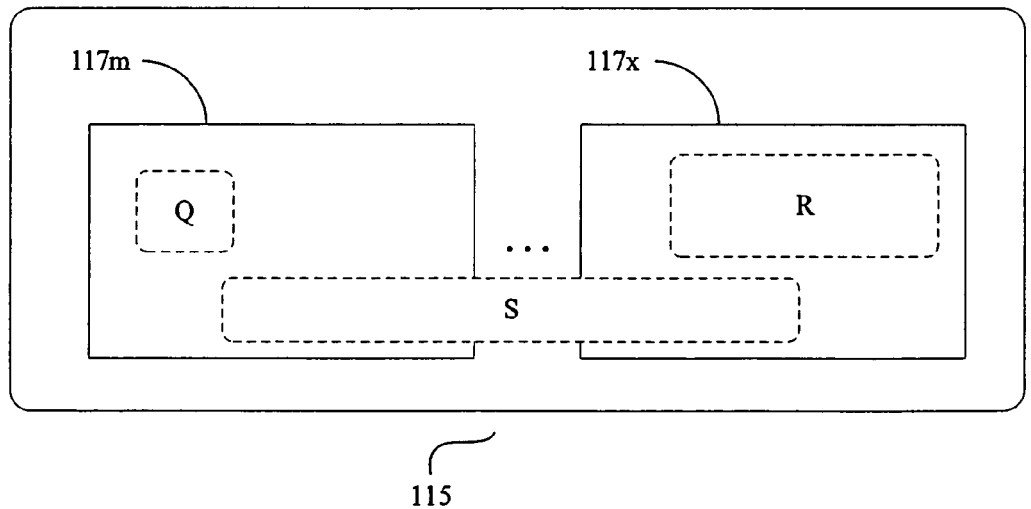

FIG. 1 is a block diagram illustrating example embodiments of a processor 111 and processing systems 113, 115 that each includes one or more "power islands". A power island is an electrically autonomous portion of a processing system that operates on a power grid separate from the rest of the processing system. FIG. 1 illustrates, as discussed below, that a "power island" is a term intended to encompass any portion of the digital components of a processing system; a "power island" may include only selected portions of a processor, may include an entire processor, may include a plurality of processors, may include selected portions of a plurality of processors, or may include other system components that do not include a processor at all.

Each of the embodiments 111, 113, 115 illustrated in FIG. 1 includes one or more programmable counter registers and one or more power management units ("PMU"). The power management unit(s) are responsible for utilizing values in the programmable registers, during selective control of power to the power islands, to determine whether a power island has had sufficient time to become fully powered-up when transitioning from a low power state. Each power island or group of power islands may have its own individual PMU. Alternatively, or in addition, to the processor- or subsystem-level PMUs for each power island, each embodiment 111, 113, 115 may include a global PMU.

FIG. 1 illustrates a first embodiment 111, wherein the components of a single processor 117a are organized into one or more power islands A-C. Each power island A-C includes a portion of the components of the processor 117a. The processor 117a illustrated for embodiment 111 includes one or more components organized into a portion labeled as "A". Portion A may be, for at least one embodiment, a power island. The processor 117a may optionally include one or more additional portions organized as additional power islands (such as, for example, B and C). The components of the processor 117a may be organized into power islands in any combination, according to design considerations. The components of the processor 117a include at least one programmable counter register, as is described in further detail below, to be used during selective management of power to the power island(s) A-C.

It should be noted that, for an embodiment of a processing system that includes a single processor, the entire processor 117a may itself be a single power island. Or, the single processor may be part of a single power island that includes other components of the processing system. See, for example, the discussion of FIG. 3, below.

FIG. 1 further illustrates example multi-core embodiments 113, 115 of computing systems that may be organized into one or more "power islands." The first 113 of the multi-core embodiments includes two or more processing cores 117b through 117n. Each of the cores 117b-117n may itself be organize above. Each of the cores 117b-117n may also include one or more programmable counter registers, and may include a PMU. The cores 117b-117n need not necessarily be symmetric; the components of each may be different and, even if the components of the cores 171b-117n are the same, such components may be grouped differently, in various embodiments, into respective power islands A, B, C and X, Y, Z.

The second of the multi-core system embodiments illustrated in FIG. 1 depicts at least one embodiment 115 of a multi-core system in which components from different cores 117m-117x are grouped together as power islands. Some components for each of the cores 117m-117x may be grouped together with other components from the same processor core into power islands, such as power island Q for processor core 117m and power island R for processor core 117x. One or more components from each of two or more different cores may be grouped together as a single power island, such as power island S, which includes components from two or more cores 117m-117x. Again, each of the cores 117m-117x and/or the system 115 may include one or more programmable counter registers to be utilized during selective power management to the power islands Q, R, S.

Figure 2:
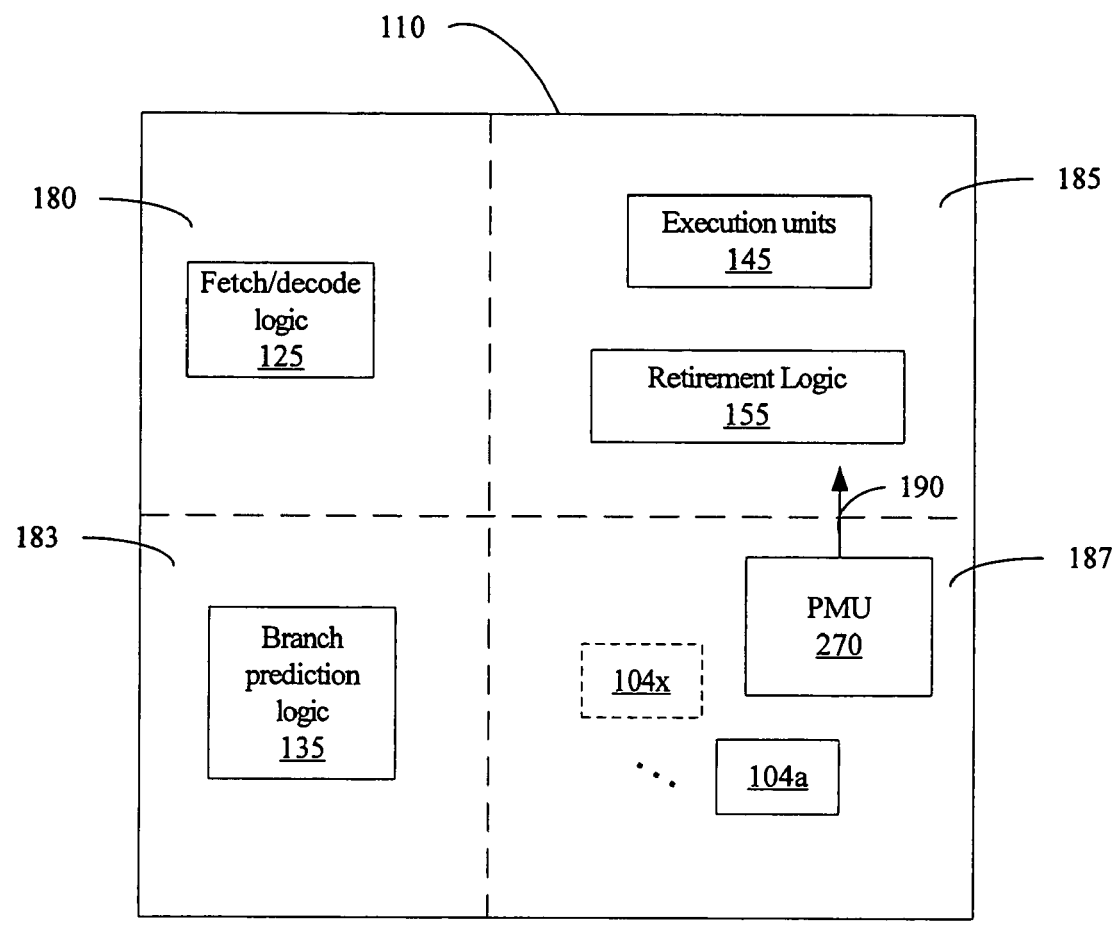
FIG. 2 is a block diagram illustrating at least one embodiment of a processor that includes a programmable counter register.

FIG. 2 is a block diagram illustrating further detail for an example embodiment of a processor 110 that includes at least one programmable power island counter register 104 according to at least one embodiment of the present invention. Embodiments of the processor 110 may be utilized for any type of computing system, including portable computing devices, desktop computing devices, server system, embedded applications, and the like.

FIG. 2 illustrates that the processor 110 may include various components (such as, for example, execution units 145, fetch and decode logic 125, branch prediction logic 135, retirement logic 155, etc.). The components 125, 135, 145, 155 are provided for illustrative purposes only, and should not be taken to be limiting. Other, or different, processor components may be incorporated into embodiments of the processor 110.

FIG. 2 illustrates that the components of the processor 110 may be divided into portions 180, 183, 185, 187 for purposes of selective power management. The portions 180, 183, 185, 187, which may be referred to as "power islands", may be digital components organized to operate on independent power grids. The components of the processor 110 may be thus organized into power islands 180, 183, 185, 187 such that each power island includes one or more components of the processor 110. One of skill in the art will recognize that the sample embodiment 110 illustrated in FIG. 2 is merely illustrative of one example embodiment. Other, or additional components, may be present in a processor core 110, and may be arranged into different power island arrangements without departing from the scope of the appended claims. For example, an alternative embodiment may allocate the execution units 145 into different power islands. For example, integer execution units may be allocated to one or more power islands separate from one or more power islands to which multimedia and/or floating point execution units are allocated. Any number of power islands may be employed.

FIG. 2 illustrates that the processor 110 may also include one or more programmable counter register(s) 104. The optional nature of additional programmable counter registers (through 104x) is denoted by dotted lines in FIG. 2. The processor 110 may also include a PMU 207, which manages selective power application to the components of the processor 110. The PMU 207 may utilize the contents of the programmable counter registers 104 to perform its power management duties. Additional features of PMU processing are discussed below in connection with FIGS. 4 and 7.

The programmable counter register(s) 104 may each hold a value that represents a minimum power-up time for one or more associated power island(s) 180, 183, 185, 187. For example, for the sample embodiment 110 illustrated in FIG. 2, each of four programmable counter registers 104a-104x may hold a minimum wakeup time value for an associated one of the four power islands 180, 183, 185, 187. That is, for such embodiment, a dedicated programmable counter register 104a-104x is associated with each power island 180, 183, 185, 187.

Alternatively, it may be that two or more of the power islands require exactly the same amount of time to power up. In such case, a single power island counter register 104 may be utilized to hold a minimum wakeup wait time that is applicable to two or more power islands. Or, a single programmable counter register 104 may be used to hold a minimum wakeup value for each of multiple power islands, where the power islands are never powered up at the same time. Notably, because the programmable counter registers 104a-104x are programmable, the wakeup wait time for each power island is not limited to a fixed value, and a programmable counter register's 104a contents may be updated to accommodate any of several different power islands.

The sample power islands 180, 183, 185, 187 set forth in FIG. 2 are for illustrative purposes only. Generally, the power islands for a processor may be organized such that a particular power island may selectively receive full operating voltage in different usage scenarios. Accordingly, one of skill in the art will recognize that, according to design considerations, the components of a processor 110 may be divided into any reasonable number (X) and configuration of independent power islands. A programmable counter register 104 need not necessarily be in a power island separate from the power island it is associated with. Similarly, the PMU 207 may be designed to reside in any of the power islands, either by itself or with other processor components.

Figure 3:
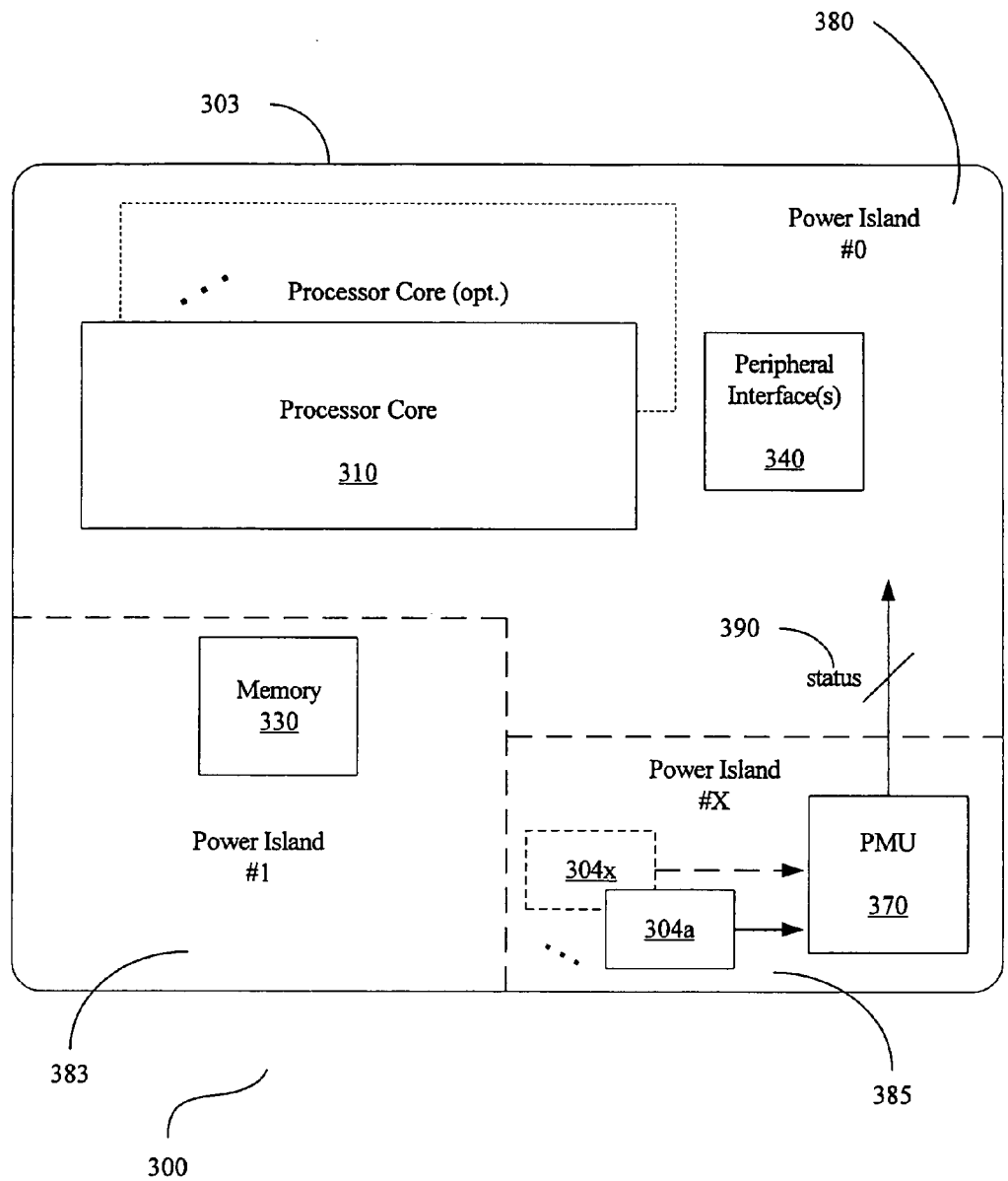
FIG. 3 is a block diagram illustrating at least one embodiment of a processing system that includes a programmable counter register.

FIG. 3 is a block diagram illustrating an example system 300 that includes at least one programmable counter register 304 according to at least one embodiment of the present invention. FIG. 3 illustrates that a processing system 300 may include various components including a processor core 310, a memory 330, and at least one peripheral interface 340. The system 300 illustrated in FIG. 3 may be an embodiment of a system-on-a-chip ("SOC"), wherein various components 310, 330, 340 of a computing system, which perform separate tasks, are integrated into a single chip package 303.

One of skill in the art will recognize, of course, that components of processing system need not necessarily be incorporated into a single chip package to comport with the scope of the appended claims. Embodiments of the invention disclosed herein may be incorporated into both SOC systems and multi-chip systems. Accordingly, the single chip package 303 illustrated in FIG. 3 is an optional feature.

One of skill in the art will also recognize that the sample embodiment 300 illustrated in FIG. 3 is merely one illustrative example of an SOC embodiment. Many other components, such as one or more additional processing core(s), additional memory (flash, RAM and/or ROM), universal asynchronous receiver-transmitters ("UARTs"), parallel ports, DMA (direct memory access) controllers, accelerators, modems, etc. may be included in an SOC chip without departing from embodiments of the present invention.

The components of a processing system 300 may be laid out in a planar fashion (as shown), may be stacked, or may be organized as any combination of layout approaches. For a multi-core embodiment, each processor core 310 need not be symmetric, in terms of size, power, functionality, etc., with the other cores 310 of the system 300. The optional nature of additional processor cores 310 in system 300 is denoted in FIG. 3 by broken lines for optional processor core(s).

For at least one embodiment, the system 300 may include system-level programmable counter register(s) 304a-304x, as shown in FIG. 3. Alternatively, at least one embodiment may include one or more programmable counter registers(s) associated with the processor core 310 (see, e.g., 104a-104x, FIG. 2), as well as, or instead of, programmable counter register(s) 304 associated with system-level power management.

FIG. 3 illustrates that the components of the system 300 may be divided into power islands 380, 383, 385 for purposes of selective power management. A system-level power management unit 370 ("PMU") may be responsible for selectively removing and applying power to the power islands 380, 383, 385 of the system 300. The PMU 370 may also determine, after power has been applied to a power island, whether the power island has had sufficient time to fully transition to a full power state. Such determination may be based, at least in part, on a value in a programmable counter register 304. Based upon this determination, the PMU 370 may communicate a status 390 to the rest of the processing system 300. Each processor core 310 of the system 300 may (or may not) include its own processor-level PMU 207 (see FIG. 2).

FIG. 3 thus illustrates that at least one embodiment of system 300 may include one or more programmable counter registers 304a-304x. For at least one embodiment, each programmable counter register 304 is to hold a minimum wakeup wait time value. That is, the operation of the PMU 370, which is responsible for determining if a power island has had sufficient time to transition from a low power state to a fully-powered up operational state, may be based on the values in the programmable counter registers 304a-304x. In effect, the PMU 370 may rely on the value of a programmable counter register 304 to determine how long to wait for a particular power island of the system 300 to power up.

The optional nature of additional programmable counter registers (through 304x) is denoted by dotted lines in FIG. 3. For at least one embodiment, a dedicated programmable counter register 304a-304x is associated with each power island 380, 383, 385. However, for at least one other embodiment, a single programmable counter register 304 may be utilized to hold a minimum wakeup wait time that is applicable to two or more power islands. Again, because the programmable counter registers 304a-304x are programmable, the wakeup wait time for each power island is not limited to a fixed value. However, it should be appreciated that fixed wakeup times may be utilized in at least some embodiments of the invention. For example, for certain embodiments a combination of fixed and variable wakeup timers may be utilized, such that one or more power islands are associated with a single programmable counter register in order to facilitate variable timer variables, while one or more other power islands may be associated with a fixed wakeup time. Alternatively, it should also be understood that certain embodiments of the invention may utilize a single timer value in one or more of the programmable counter registers, such that the wakeup time for the associated power island(s) does not vary during execution.

The sample power islands 380, 383, 385 set forth in FIG. 3 are for illustrative purposes only. Generally, the power islands for a processing system may be organized such that a particular power island may selectively receive full operating voltage in different usage scenarios. Accordingly, one of skill in the art will recognize that, according to design considerations, the components of a processing system 300 may be divided into any reasonable number (X) and configuration of independent power islands.

For example, each processing core 310 may be designed to be a power island by itself. For a multi-core embodiment, for instance, it may be desirable to power down additional cores during certain usage scenarios. However, the embodiment illustrated in FIG. 3 illustrates a design that assumes that power to various other components, such as a bus subsystem (not shown in FIG. 3) and at least one peripheral interface 340, should be applied whenever at least one processor core 310 is powered up.

Similarly, all memory devices 330 for a processing system need not necessarily be in the same power island 383. For at least one alternative embodiment, for example, the memory 330 may include a flash portion and an SRAM (static random access memory) portion, each of which is a single power island. Alternatively, the memory 330 may, for example, include a relatively large memory portion, such as a 512 Kbit SRAM, that is broken down into separate power islands. For example, each 128 Kbit portion of the SRAM could be designed as an independent power island.

Figure 8:
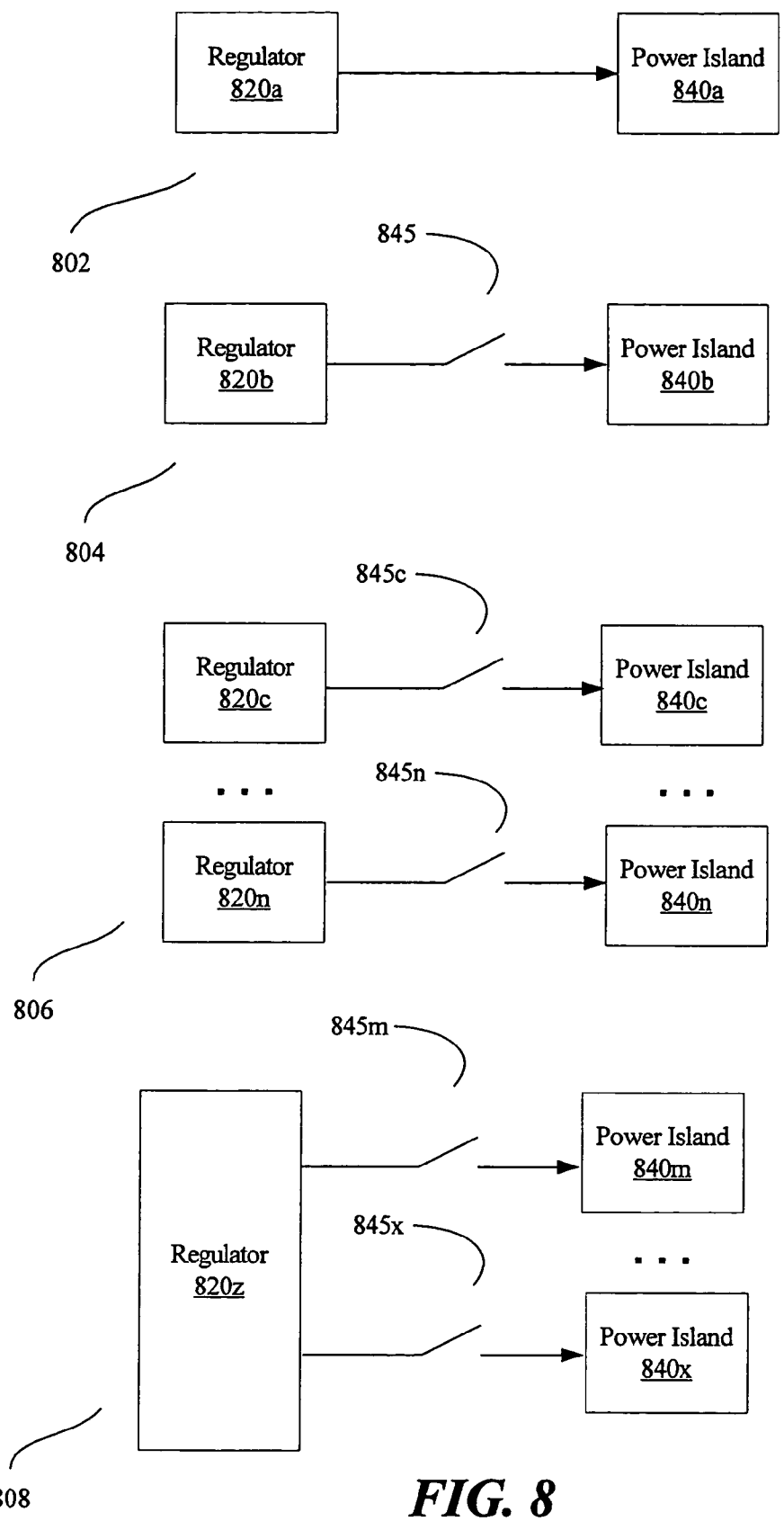
FIG. 8 is a block diagram illustrating various example embodiments of power islands.

Briefly turning to FIG. 8, which is a block diagram of various power island embodiments, one can see that power to a power island may be provided in any of several manners. For a first embodiment, 802, a regulator 820a provides power to the power island 840a. Regulator 820a may be controlled by a power management unit (see, for example, PMU 170 and 370 of FIGS. 2 and 3, respectively).

FIG. 8 further illustrates that, for a second embodiment 804, an optional switch 845 controls the supplying of power between the regulator 820b and the power island 840b. Again, a power management unit, such as PMU 170 of FIG. 2 and/or PMU 370 of FIG. 3, may control the switch 845.

FIG. 8 further illustrates an embodiment, 806, that includes a plurality of power islands 840c-840n. Each power island

840c-840n may be supplied with power by a dedicated regulator 820c-820n, respectively. Again, each regulator-island pair (820, 840) may be associated with an optional switch 845 (see 845c-845n).

FIG. 8 further illustrates an alternative embodiment 808 for supplying power to a plurality of power islands 840m-840x. For such embodiment 808, a single regulator 820z supplies power to all power islands 840m-840x. For such embodiment, switches 845m-845x are not optional. Such switches 845m-845x control whether the associated power island 840m-840x is to receive power from the shared regulator 820z. Again, for embodiments 806 and 808, regulators 820c-820n, 820z and operation of the switches 845c-845n, 845m-845x, may be controlled by a power management unit such as PMU 170 illustrated in FIG. 2 and/or PMU 370 illustrated in FIG. 3.

For each of the embodiments 802, 804, 806, 808 illustrated in FIG. 8, the regulators 820a-820z may be located on the same chip as the associated power island(s) 840a-840x. Alternatively, the regulators 820a-820z may be located on a different chip within the computing device or system.

Figure 4:
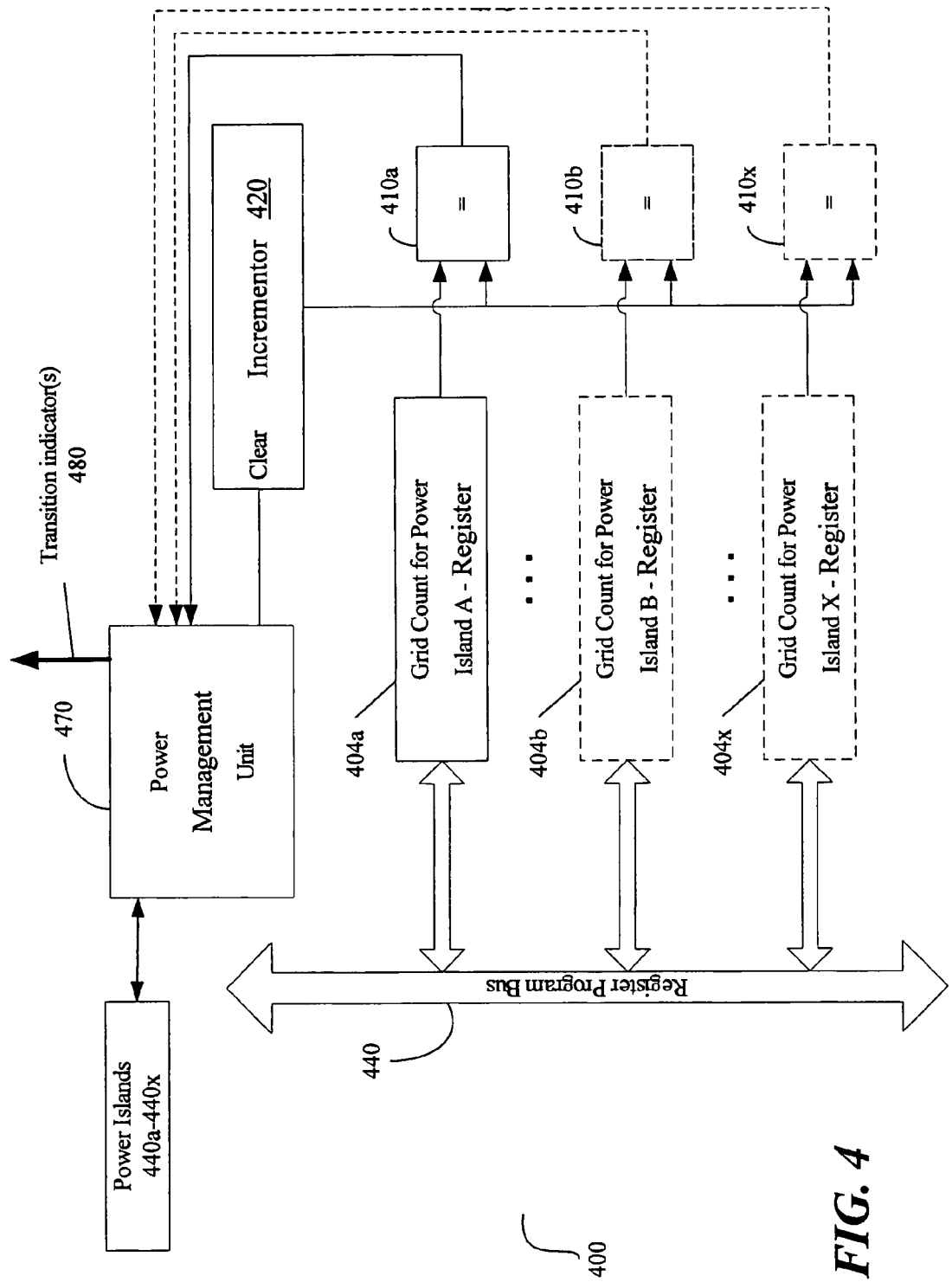
FIG. 4 is a block diagram illustrating at least one embodiment of a power management unit that receives an input based on a value in a programmable counter register.

Turning now to FIG. 4, a block diagram is presented to illustrate at least one embodiment of a processing system 400 that includes a power management unit ("PMU") 470 that may receive one or more inputs based on values in programmable counter registers 404a-404x. FIG. 4 is discussed below with reference to FIG. 8. The PMU 470 may be a processor PMU, such as PMU 170 illustrated in FIG. 2, or may be a system-level PMU, such as PMU 370 illustrated in FIG. 3. Alternatively, PMU 470 may be applied to a larger or smaller scope of power islands than those illustrated in FIGS. 1-3.

FIG. 4 illustrates multiple programmable counter registers 404a-404x, each associated with a respective comparator 410a-410x. Additional programmable counter registers 404b-404x and respective comparators 410b-410x are optional and are thus denoted in FIG. 4 with dotted lines.

The comparators 410a-410x determine whether a current time count, as reflected by an incrementor 420, matches the counter value in its associated register 404a-404x. The PMU 470 may receive and utilize outputs from one or more of the comparators 410a-410x to count how long to wait, after providing power to a particular power island 440, before indicating to the rest of a processing system 400 that the power island is fully powered up.

For at least one embodiment, the values in each programmable counter register 404a-404x reflect a minimum time that an associated power island 440a-440x, needs in order to fully power up. That is, when the PMU 470 powers up a power island 440a-440x, the PMU 470 should wait for a predetermined amount of time to ensure that the power island 840 is completely powered up before indicating to the rest of the processing system 400 that the power island has exited from a low power state and is fully powered up. The status indicator(s) 480 provided to the rest of the system 400 may indicate whether all power islands selected to transition out of a low power state have had time to complete their transition to full power. The PMU 470 may utilize the output value from one or more of the comparators 410a-410x to determine when to indicate an exit from a reduced power state for the computing system 400.

Referring for a moment to FIG. 8, "powering up" a power island may involve closing a switch 845 between the power island 840 and an associated regulator 820. "Powering up" a power island 840 may alternatively or additionally involve control of power to a regulator 820 that provides power to the power island 840.

FIG. 4 illustrates, for at least one embodiment, that the value from a single incrementor 420 is utilized as an input to each of the comparators 410a-410x. According to such embodiment, the value of the incrementor 420 is reset upon application of power to one or more power islands, and is not reset again until each affected power island has completely powered up (that is, until the output of each affected comparator 410a-410x has evaluated to "true").

For an alternative embodiment in which it may be desirable to power up one or more additional power islands before a first set of one or more power islands has fully powered up, additional incrementor(s) 420 may be utilized.

FIG. 4 illustrates that the counter registers 404a-404x are programmable in that their values may be set via a program bus 430, in response to one or more code instructions. The program bus 430 may be a traditional multi-drop bus. Alternatively, the bus 430 may instead be any other type of communications pathway, including a point-to-point interconnect.

The programmable counter registers 404a-404x may be architecturally visible registers such that their values may be dynamically modified during execution of software code generated by a user. That is, the programmable counter registers 404a-404x may be modified responsive to a user-level instruction. Alternatively, the programmable counter registers 404a-404x may be microarchitectural registers that only programmable in response to execution of internal microcode instructions or other internal signals. Such internal instructions or signals may be referred to as "supervisor-level" instructions.

In either embodiment, programmability allows for the values of the counter registers 404a-404x to be dynamically modified during code execution. For example, the values for each programmable counter register 404a-404x may be initialized to a particular value, at powerup, to indicate how long a wake-up period should be implemented for the power island(s) associated with the register 404. Such initial value may be a worst-case value. However, during execution of the system 400 (during, for example, reset processing), the values for one or more of the programmable counter registers 404a-404x may be modified. Such modification may allow the programmable counter register 404 to reflect a lower value (i.e., no longer a worst-case value) to allow for quicker exit from a reduced-power state for specific situations.

During various usage scenarios, different power islands may be powered down. Any state in which at least one power island is not receiving full operating power may be referred to herein as a "low power state." However, one of skill in the art will appreciate that a low power state does not necessarily indicate that desired functionality is limited. Instead, during a low power state, one or more active functions may be fully operational, while power islands not utilized during such active functions may be powered down.

For example, a "low power" state for a computing device may, of course, include usage scenarios associated with a sleep state, such as when the device is powered up, but is not being used for any user function. Such sleep may occur, for example, when a cell phone or notebook or desktop computer is powered up, but has not been activated for any user function for at least a predetermined amount of time. In such case, the screen need not be active. Thus, the power island(s) associated with the display for the device may be powered down during such usage scenario. Because user applications need not run during such scenario, any power island(s) associated with user applications may also be powered down. Yet, other power island(s), such as those utilized to recognize and process an incoming input signal (e.g., incoming phone call, user keystroke, etc.), may remain fully powered up.

Another example is a "low power" state in which active user functions are being performed. For example, if a user wishes to utilize a computing device, such as a smart cellular telephone, to listen to audio information (such as music files stored in the MP3 format), and does not wish to be interrupted by an incoming phone call during such operation, a usage mode may be entered wherein the power island(s) associated with running an MP3 application may be fully powered up, but one or more power island(s) associated with receiving an incoming call may be powered down.

Accordingly, a "low power" state as used herein connotes that at least one power island has been powered down, but does not necessarily mean that the device is not performing active user functions.

Figure 5:
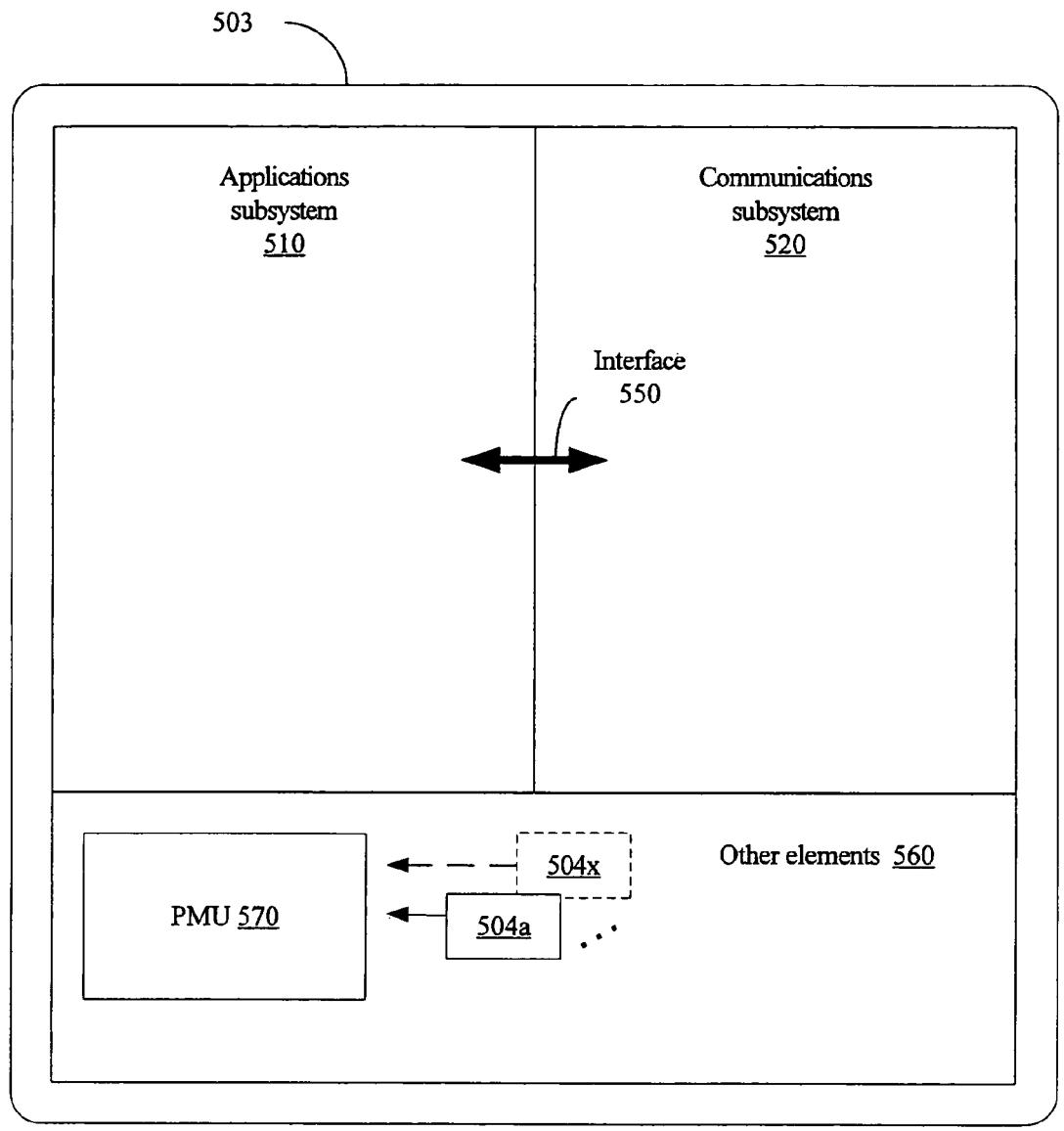
FIG. 5 is a block diagram illustrating at least one embodiment of a system-on-a-chip processing system that may perform disclosed techniques.

FIG. 5 is a block diagram illustrating an embodiment of a processing system 500 that may include an embodiment of one or more programmable counter registers 504a-504x. The system 500 may be based on a system-on-a-chip (SOC) design that incorporates a plurality of processing elements in a single chip package 503. The specific SOC embodiment 500 illustrated in FIG. 5 may be utilized in a portable computing device. However, such example should not be taken to be limiting. Other SOC embodiments may, instead, be devised to include programmable counter registers for systems geared toward desktop or server processing.

The processing elements of the system 500, which may be integrated circuits, may include one or more processor subsystems, such as an applications subsystem 510 and a communications subsystem 520. The processing elements may also include an intra-chip communications interface 550, and one or more other elements 560. The other elements 560 may include, for example, any or all of the following: a clock unit, system-level memory, chip input/output pads, a test unit, a chip-level or system-level PMU 570, and the like.

As with the system-level PMU 370 discussed above in connection with FIG. 3, the chip-level (for a SOC system embodiment) or a system-level (for multi-chip system embodiments) power management unit 570 ("PMU") may be responsible for selectively removing and applying power to the power islands of the system 500. The PMU 570 may also determine, after power has been applied to a power island, whether the power island has had sufficient time to fully transition to a full power state. Such determination may be based, at least in part, on a value in a programmable counter register 504. Based upon this determination, the PMU 570 may communicate a status 390 to the rest of the processing system 500.

For the SOC system embodiment 500 illustrated in FIG. 5, applications subsystem 510 may be designed to exert overall device control for the device that incorporates the processing system 500. Examples of such devices may include, without limitation, laptop and handheld computing devices, cellular telephones (including but not limited to those based on the International Telecommunications Union's third generation ("3G") specification for mobile communications technology) and handheld client devices such as personal digital assistants and the like. These devices may include other analog or digital components, such as a camera, a television receiver, and/or a global positioning system, along with the digital elements of the processing system 500.

The communications subsystem 520 may responsible, for at least one embodiment, for providing telephony functionality to the applications subsystem 510 and/or for maintaining a connection to an appropriate wireless network, to telephony services and to data services in support of the applications subsystem 510. As such, the communications subsystem 520 may support various wireless interface protocol standards.

The communications subsystem 520 may select among different protocols and carriers, establish network connectivity, monitor network connectivity, and handle hand-off between zones or networks.

Figure 6:
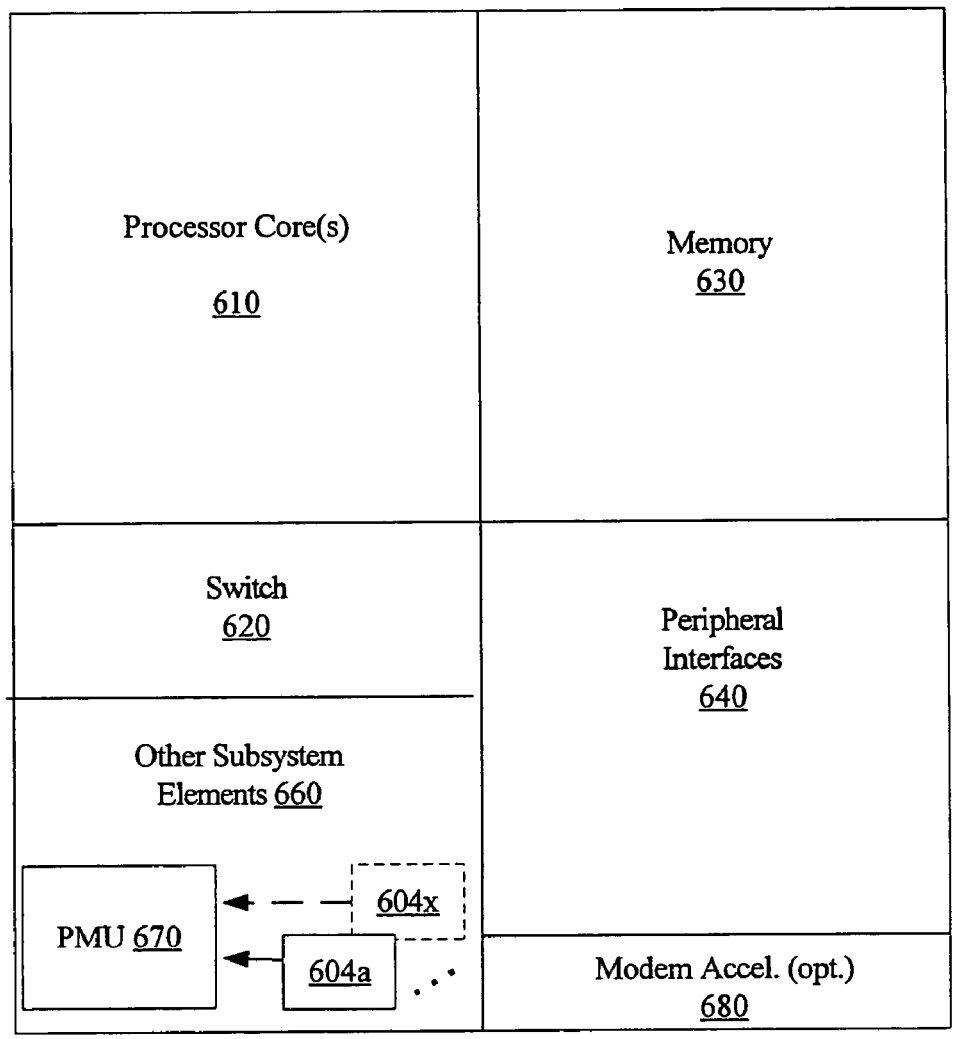
FIG. 6 is a block diagram illustrating at least one embodiment of a subsystem that includes a programmable counter register.

FIG. 6 is a block diagram illustrating at least embodiment 600 of digital elements that may be included in the communications subsystem 520 and/or the applications subsystem 510 illustrated in FIG. 5. FIG. 6 is discussed herein in with reference to FIG. 5. The subsystem elements 600 may include one or more processor cores 610, a communications switch 620, a memory 630, peripheral interfaces 640, and other subsystem elements 660. In addition, the communications subsystem 520 may also include a modem accelerator 680.

The processor core 610 may include a digital signal processor, a microcontroller, or both. Alternatively, the processor core 610 may be a general purpose processor. The processor core 610 of the communications subsystem 520 need not necessarily be, but may be, of the same architecture as the processor core 610 for the applications processor 510.

The other subsystem elements 660 of the communications processor may include accelerators to aid in the transmitting and receiving of data, such as a Viterbi accelerator and/or a cipher accelerator. FIG. 6 illustrates that an embodiment of the subsystem 510, 520 may include a subsystem-level PMU 670 and associated programmable counter registers 604a-604x. For such embodiments, the subsystem-level power counter registers 604a-604x may hold minimum wakeup time values for the power islands of each subsystem 510, 520. Such register values may also be utilized by a system-level PMU, such as PMU 570 illustrated in FIG. 5. Alternatively, PMU 570 may be associated with a separate set of dedicated programmable counter registers 504a- 504x.

Figure 7:
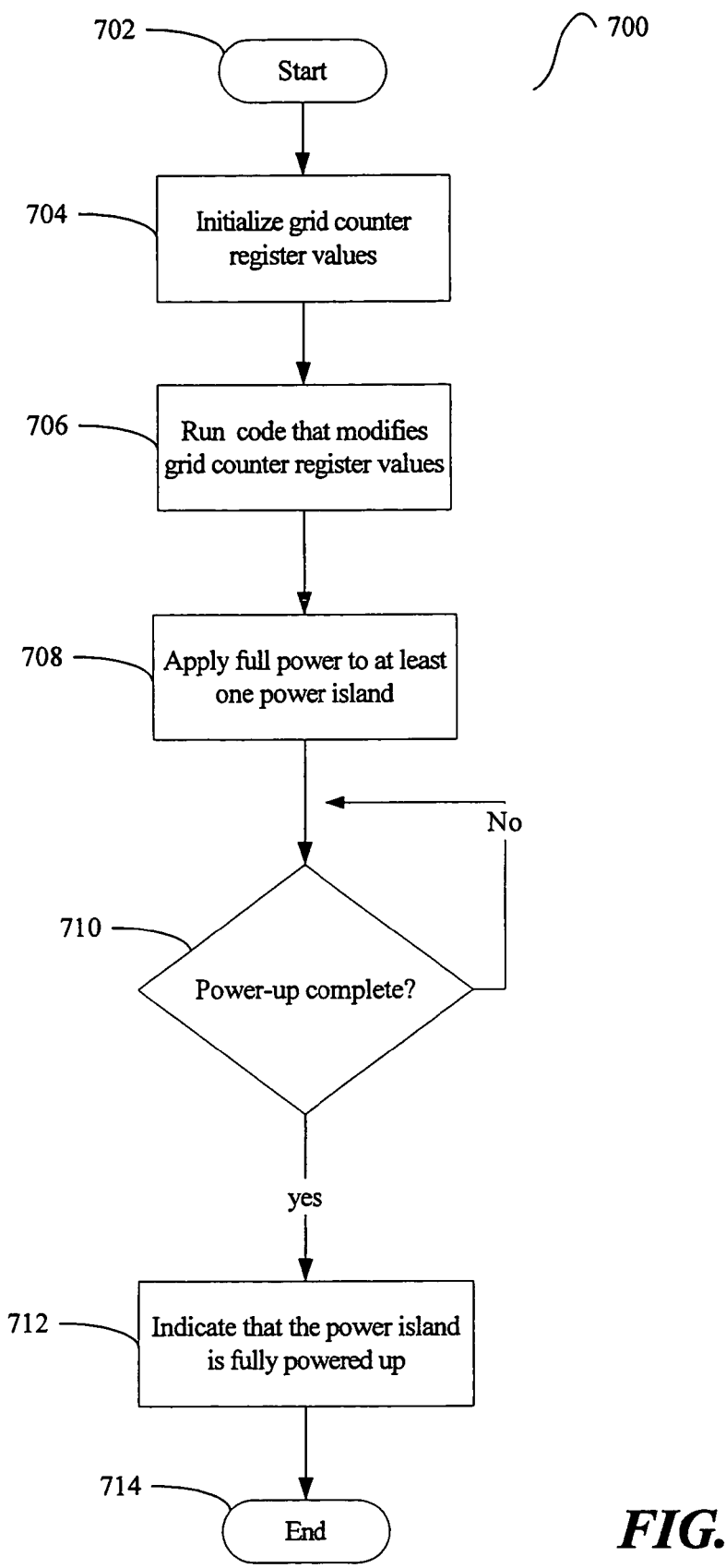
FIG. 7 is a flowchart illustrating at least one embodiment of a method for utilizing a programmable counter register to perform power management.

FIG. 7 is a flowchart illustrating at least one embodiment of a method 700 for utilizing programmable counter registers (see, for example, 104a-104x of FIG. 2; 304a-304x of FIG. 3; 404a-404x of FIG. 4; 504a-504x of FIG. 5, and 604a-604x of FIG. 6) to modify the minimum wakeup wait time for portions of a computing system. FIG. 7 is discussed herein in connection with FIG. 8. The method 700 may be performed by a portable computing device, such as a laptop computer, handheld cellular telephone, handheld personal digital assistant, or the like, and may also be performed by any other digital computing device or system.

For simplicity and ease of discussion, programmable counter registers (see, for example, 104a-104x of FIG. 2 ; 304a-304x of FIG. 3; 404a-404x of FIG. 4; 505a-505x, and 604a-604x of FIG. 6) will be referred to in the discussion of FIG. 7 using reference numerals 404a-404x, which are presented generically in FIG. 4, without reference to a particular system scope. However, one of skill in the art will understand that such shorthand reference to registers 404a-404x in the discussion of FIG. 7 is meant to refer to any and all embodiments of programmable counter registers encompassed in the scope of the appended claims, including (but not limited to) processor-level registers 104a-104x, system-level registers 304a-304x and 504a-504x, and generic-scope registers 404a-404x, and subsystem-level registers 604a-604x.

FIG. 7 illustrates that the method 700 begins at block 702 and proceeds to block 704. At block 704, the programmable registers 404a-404x are loaded with default values. Such default values may be worst-case values. The values may be loaded 704, for example, during initialization processing when the portable device is first powered up. The worst-case values loaded at block 704 may be determined, for example, at a very early stage of development for the computing system, such as at the layout design stage, before silicon for the digital portions (see, e.g., FIGS. 2, 3, 5 and 6) of the computing device have been produced.

FIG. 7 illustrates that the method 700 proceeds from block 704 to block 706. At block 706, software or firmware code (such as microcode) is run to dynamically modify a value for at least one of the programmable counter registers 404a-404x. Such code may be executed 706, for example, during reset processing for the computing device. The modified value written at block 706 may reflect a smaller or larger time value than the default value that was written to the register at block 704. Such modified value may, for instance, take into account unexpected variations due to a particular manufacturing process technology used to generate the digital portion of the computing device.

Alternatively, the value loaded at block 706 may vary for a particular register, depending on the usage scenario. For example, during a particular usage scenario, a particular power island 840 may be powered down by disabling its associated regulator 820z. For such embodiments, the regulator remains powered up, but it is disabled such that it is not driving any voltage other than common ground on its output ports. During another usage scenario, for example, the same power island 840 is powered down, not by disabling its regulator 820, but by simply opening a switch 845 between the regulator 820 (which remains enabled during the usage scenario) and the power island 840. For a hypothetical computing device, the first usage scenario may be considered a "deep sleep" or "hibernate" power state, while the second usage scenario may be considered a "light sleep" or "snooze" power state. For the former, a longer wakeup wait time may be useful, in order to allow for the regulator to fully enter an enabled state from the disabled state. For the latter usage scenario, however, a shorter wakeup wait time may be preferable, since time is not needed for the regulator to become enabled. For such hypothetical computing device, the value loaded into the register 204 at block 706 may thus vary according to the usage scenario.

From block 706, the method 700 proceeds to block 708. Of course, one of skill in the art will recognize that other operations not illustrated in FIG. 7 may be performed between bocks 706 and 708. For example, between blocks 706 and 708, one or more other usage scenarios may be entered and exited, such that power islands have been powered down and/or up (or vice versa); accordingly, the associated register 404 values may have been modified further between blocks 706 and 708.

At block 708, power is applied to a power island in order to cause the power island to begin a transition from a powered down state to a fully operational power state. The "powered down" state, as is explained above, may include disabling the associated regulator 820, or may simply involve opening a switch 845 between an enabled regulator 820 and the power island 840 of interest.

At block 708, an incrementor (see, e.g., incrementor 420 in FIG. 4) is cleared, such that the value in the incrementor 420 is ready to be "counted up". For at least one embodiment, the incrementor value is incremented, between blocks 708 and 710, once for each clock cycle. Alternatively, however, the incrementor may be implemented as a power-down counter and may be initialized at block 708 to an appropriate value. For such embodiment, the incrementor value may be decremented for each clock cycle between blocks 708 and 710. For either embodiment, processing then proceeds to block 710.

At block 710, it is determined whether the power island 840 to which full power was applied at block 708 has had sufficient time to fully power up. For at least one embodiment, such determination may be made by a power management unit such as, for example, PMU 270, 370, 470, 570, and/or 670 (see FIGS. 2-6) based on input from a comparator, such as comparator 410a-410x illustrated in FIG. 4. The PMU may thus determine whether sufficient wakeup wait time has elapsed since full power was applied to the power island 840 at block 708. As is illustrated in FIG. 4, a dedicated register 404-comparator 410 pair may be utilized for each power island 440 in order to make the determination at block 710. Alternatively, a shared register 404-comparator 410 pair may be used for several power islands that are each associated with the same wakeup wait time.

Also, for at least one alternative embodiment, a single register 404 may hold the minimum wakeup wait time for more than one power island 440. Such may be the case, for example, when two or more power islands 440 are never to be powered up at the same time. Consider, for instance, a computing device that includes two separate modems, where each modem supports a different communications standard-such as a wideband code-division multiple access ("WCDMA") modem and a GSM (Global System for Mobile communications) modem. For such computing device, if each of the modems is a separate power island, and it is not the case that both such power islands would be powered up at the same time, then the same register 404 may be utilized for both power islands. The PMU, which presumably is already aware of which power island it powered up at block 708, can utilize the comparator 410 output to determine at block 710 whether power-up for the power island of interest 440 has had time to complete.

If the determination at block 710 evaluates to "true", then processing proceeds to block 712. At block 712, an a transition indicator (see, e.g., 190 of FIG. 2, 390 of FIG. 3, and 480 of FIG. 4) is provided to the rest of the processing system to specify that the power island 440 of interest has transitioned out of a low power state. For at least one embodiment, such transition indicator is provided to the rest of the processing system by the PMU . From block 712, processing ends at block 714.

If, however, the determination at block 710 evaluates to "false", then processing loops back to block 710. Such loop anticipates, for at least one embodiment, the action of the incrementor, which is assumed to increment the current time value for each clock cycle. Accordingly, it is assumed that, after the incrementor has operated for a sufficient number of cycles, the result evaluation at block 710 will become "true."

The foregoing discussion describes selected embodiments of methods, systems and apparatuses relating to a programmable counter counter. The mechanisms described herein may be utilized with single-core or multi-core systems. In the preceding description, various aspects of methods, system and apparatuses have been described. For purposes of explanation, specific numbers, examples, systems and configurations were set forth in order to provide a more thorough understanding. However, it is apparent to one skilled in the art that the described method and apparatus may be practiced without the specific discussed details.

A method is here, and generally, considered to be a self-consistent sequence of acts or operations leading to a desired result. One skilled in the art will recognize that the blocks representing the sequence of operations illustrated in FIG. 7 may include one or more logical functions that may be performed individually or concurrently, rather than as a single logical block. Similarly, the functions illustrated in distinct blocks in FIG. 7 may be combined and performed by a single procedure or function. The sequence of actions or operations of the disclosed method embodiments include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as values, indicators, elements, times, numbers or the like. It should be understood, however, that all of these and similar terms are to be associated with the appropriate physical quantities and are merely convenient labels applied to these quantities.

Embodiments of the methods described herein may be implemented in hardware, hardware emulation software or other software, firmware, or a combination of such implementation approaches. Embodiments of the invention may be implemented for a programmable system comprising at least one processor, a data storage system (including volatile and non-volatile memory and/or storage elements), at least one input device, and at least one output device. For purposes of this application, a processing system includes any system that has a processor core. The processor core may be any type of processing element including, for example, a digital signal processor (DSP), a microcontroller, an application specific integrated circuit (ASIC), or a general purpose microprocessor.

Embodiments of the invention may also be implemented as instructions stored on a machine-accessible medium, or as machine-accessible electrical, optical, acoustical or other form of propagated signals (e.g., carrier waves, infrared signals, digital signals, the interfaces that transmit and/or receive signals, etc.) which may be read and executed by a processing system to perform the operations described herein. A machine-accessible medium may include any mechanism for storing or transmitting information in a form readable by a machine (e.g., a computer). A program may be stored on a storage media or device (e.g., magnetic storage medium, hard disk drive, floppy disk drive, read only memory (ROM), random access memory (RAM), CD-ROM device, flash memory device, digital video disk (DVD), optical storage device, or other storage device), readable by a general or special purpose programmable processing system.

The instructions, accessible to a processor in a processing system, provide for configuring and operating the processing system when the storage media or device is read by the processing system to perform the procedures described herein. Embodiments of the invention may also be considered to be implemented as a machine-readable storage medium, configured for use with a processing system, where the storage medium so configured causes the processing system to operate in a specific and predefined manner to perform the functions described herein.

Example embodiments of such a processing system 300, 500 are shown in FIGS. 3 and 5. FIGS. 3 and 5 illustrate systems 300, 500 that includes elements for selectively managing power to independent power islands 180, 183, 185, 187 and 380, 383, 385 of the systems 300, 500, respectively, based on inputs based on the contents of programmable registers 104a-104x and 304a-304x, respectively. Sample systems 300, 500 are representative of processing systems based on Intel XScale® core, Intel® Micro Signal Architecture (Intel® MSA), Intel® PCA Cellular Processors, and/or Pentium®, Pentium® Pro, Pentium®II, Pentium® III, Pentium® 4, and Itanium® and Itanium® 2 microprocessors available from Intel Corporation, although other systems (including personal computers (PCs), pagers, cellular telephones, walkie-talkies, personal digital assistants and other hand-held devices having other microprocessors, engineering workstations, set-top boxes and the like) may also be used.

Referring to FIG. 3, a sample processing system 300 may include a memory 330 and at least one processor core 310. Memory 330 may store instructions and data for controlling the operation of the processor core 310.

Memory 330 is intended as a generalized representation of memory and may include a variety of forms of memory, such as a hard drive, CD-ROM, random access memory (RAM), dynamic random access memory (DRAM), static random access memory (SRAM), flash memory and related circuitry. Memory 330 may store instructions and/or data represented by data signals that may be executed by processor 310. The instructions and/or data may include code for performing any or all of the techniques discussed herein.

While particular embodiments of the present invention have been shown and described, it will be obvious to those skilled in the art that changes and modifications can be made without departing from the present invention in its broader aspects. For example, as used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

Also, for example, the embodiments disclosed herein of an apparatus, system and method for utilizing a programmable counter register may be used in any computing device. The device may be a handheld device, a desktop device, a server, or a laptop device to be utilized for any of a wide range of applications, including (but not limited to) personal computing, enterprise computing, embedded applications, and any wireless system including wireless local area network ("WLAN"), wireless personal area network ("WPAN"), wireless metropolitan area network ("WMAN"), cellular telephony, etc.

Also, for example, although embodiments of the apparatuses shown in FIGS. 1-6 and 8 may be practiced in hardware, the disclosed features alternatively may be practiced in a design. That is, a hardware apparatus need not be generated in order to practice such embodiments. Alternatively, a layout engineer or a "fab-less" designer of integrated circuits may practice such embodiments by embodying a design for such embodiments on a machine-accessible storage medium. For example, a hardware description language may be utilized to define integrated circuits that embody the hardware features of the embodiments described herein. Such definition may be stored on a machine-accessible medium.

Accordingly, one of skill in the art will recognize that changes and modifications can be made without departing from the present invention in its broader aspects. The appended claims are to encompass within their scope all such changes and modifications that fall within the true scope of the present invention.

What is claimed is:

1. An apparatus, comprising:
a plurality of digital components organized as two or more autonomous power islands;
a programmable counter register associated with at least a selected two of the power islands; and
a power management unit to determine, based on a minimum wakeup wait time value for the power island to transition from a low power state to a full power state stored in the programmable counter register, whether the selected power island has been fully powered up, wherein the programmable counter register is shared by at least two of the plurality of power islands that are powered up at different times, the programmable counter register programmed with a first minimum wakeup time value associated with a first power island prior to requesting that the first power island transition from the low power state to the full power state.

2. The apparatus of claim 1, wherein:
the power management unit is further to selectively control power to at least one of the two or more power islands.

3. The apparatus of claim 1, wherein:
the contents of the programmable counter register may be modified responsive to a user-level instruction during operation of the apparatus.

4. The apparatus of claim 1, wherein:
the contents of the programmable counter register may be modified responsive to an internal microarchitectural instruction during operation of the apparatus.

5. The apparatus of claim 1, wherein: the digital components further comprise at least one execution unit.

6. The apparatus of claim 1, wherein the digital components further comprise: a first processor core and a second processor core.

7. The apparatus of claim 1, wherein the digital components further include:
a communication pathway via which the value in the programmable counter register may be modified.

8. The apparatus of claim 1, further comprising:
a plurality of programmable counter registers, each associated with a different one of the power islands.

9. The apparatus of claim 8, further comprising:
a plurality of comparators, each coupled to one of the programmable counter registers and to the power management unit.

10. The apparatus of claim 9, further comprising:
a plurality of incrementors, each coupled to at least one of the comparators.

11. The apparatus of claim 1, further comprising:
a comparator coupled to the programmable counter register and to the power management unit.

12. The apparatus of claim 11, further comprising:
an incrementor coupled to the comparator.

13. The apparatus of claim 1, wherein:
said power management unit is further to generate an indicator to specify whether the selected power island has fully powered up.

14. The apparatus of claim 1, wherein:
the contents of the programmable counter register may be modified responsive to a supervisor-level instruction during operation of the apparatus.

15. A system comprising:
an antenna; and
a plurality of components coupled to the antenna, wherein said components comprise one or more independent power islands;
at least one electrically autonomous portion of a computing device; and
a power management unit to selectively control power to the portion and to determine, based on a minimum wakeup wait time value for the power island to transition from a low power state to a full power state stored in a programmable counter register, whether the portion has transitioned into a fully-powered state, wherein the programmable counter register is shared by at least two electrically autonomous portions of the computing device that are powered up at different times, the programmable counter register programmed with a first minimum wakeup time value associated with a first portion prior to requesting that the first portion transition from the low power state to the full power state.

16. The system of claim 15, further comprising:
an analog component coupled to the antenna.

17. The system of claim 16, wherein:
said analog component further comprises a camera.

18. The system of claim 15, wherein:
said power management unit is further to generate an indicator to specify whether the portion has transitioned into the fully-powered state.

19. The system of claim 15, further comprising:
a second electrically autonomous portion of the computing device.

20. The system of claim 19, further comprising:
a chip package to include the portion and the second portion.

21. The system of claim 15, wherein:
said portion comprises a processor core.

22. The system of claim 15, further comprising:
a chip package to include the portion.

23. A method comprising:
initializing a programmable register with an initial minimum wakeup wait time value for the power island to transition from a low power state to a full power state stored for a power island;
executing a code sequence;
modifying the value for the programmable register, responsive to one or more instructions of the code sequence;
sharing the programmable register by at least two power islands that are powered up at different times;
prior to applying power to the first power island, storing a first minimum wakeup time value associated with a first power island in the programmable register;
applying power to the power island;
determining, based on the modified value of the programmable register,
whether the power island has completely powered up; and
if so, generating a transition indicator.

24. The method of claim 23, wherein said determining further comprises:
comparing the modified value of the programmable register with a current time value.

25. The method of claim 24, further comprising:
obtaining the current time value from an incrementor.

26. The method of claim 24, further comprising:
generating the indicator based on the comparison of the modified value with the current time value.

27. The method of claim 23, wherein:
the code sequence is a user-provided software sequence.

28. The method of claim 23, wherein: the code sequence is an internal microcode sequence.

29. A machine-accessible medium storing an integrated chip design, the integrated chip comprising:
a plurality of components organized to operate on one of one or more independent power grids, wherein said components are arranged as a plurality of independent power islands;
a programmable counter register associated with at least a first portion of the components; and
a power management unit to determine, based on a minimum wakeup wait time value for the power island to transition from a low power state to a full power state stored in the programmable counter register, whether the first portion has fully powered up, wherein the programmable counter register is shared by at least two of the plurality of power islands that are powered up at different times, the programmable counter register programmed with a first minimum wakeup time value associated with a first power island prior to requesting that the first power island transition from the low power state to the full power state.

30. The machine-accessible medium storing an integrated chip design as recited in claim 29, wherein:
the power unit is further to selectively control power to the first portion.

31. The machine-accessible medium storing an integrated chip design as recited in claim 29, the components further comprising, wherein:
the contents of the programmable counter register may be modified responsive to a user-level instruction during operation of the apparatus.

32. The machine-accessible medium storing an integrated chip design as recited in claim 29, the components further comprising, wherein:
the contents of the programmable counter register may be modified responsive to an internal microarchitectural instruction during operation of the apparatus.

33. The machine-accessible medium storing an integrated chip design as recited in claim 29, wherein:
the components are further designed to comprise at least one execution unit.

34. The machine-accessible medium storing an integrated chip design as recited in claim 29, wherein:
the components are further designed to comprise a first processor core and a second processor core.

35. The machine-accessible medium storing an integrated chip design as recited in claim 29, the components further comprising:
a communication pathway via which the value in the programmable counter register may be modified.

36. The machine-accessible medium storing an integrated chip design as recited in claim 29, the chip further comprising:
a comparator coupled to the programmable counter register and to the power management unit.

37. The machine-accessible medium storing an integrated chip design as recited in claim 29, wherein:
said power management unit is further to generate an indicator to specify whether the first portion has transitioned into a fully-powered state.

38. The machine-accessible medium storing an integrated chip design as recited in claim 28, the chip further comprising:
a plurality of programmable counter registers, each associated with a different one of the power islands.

39. The machine-accessible medium storing an integrated chip design as recited in claim 38, the chip further comprising:
a plurality of comparators, each coupled to one of the programmable counter registers and to the power management unit.

40. The machine-accessible medium storing an integrated chip design as recited in claim 39, the chip further comprising: a plurality of incrementors, each coupled to at least one of the comparators.

* * * * *